United States Patent Office 3,379,535
Patented Apr. 23, 1968

3,379,535
MICRODISPERSIONS OF MONOGLYCERIDES AND PROCESS OF PREPARING AND USING SAME
Bert W. Landfried, Independence, Mo., and Robert M. Rapaport, Prairie Village, Kans., assignors to Top-Scor Products, Inc., Kansas City, Kans., a corporation of New York
No Drawing. Filed July 22, 1964, Ser. No. 384,538
3 Claims. (Cl. 99—91)

ABSTRACT OF THE DISCLOSURE

A plastic agent for incorporation into food products comprises a stable and uniform crystal dispersion of monoglyceride in water, the monoglyceride being derived from fully hydrogenated fats and characterized as having an average size of crystals of dispersion of less than approximately 20 microns, the monoglyceride to water ratio being about 1:4 by weight. The process for manufacturing such plastic agent includes mixing the water and monoglyceride at a temperature whereat a gel is formed, subjecting the gel to agitation and crystal size reducing stresses at a first transition temperature characterized by a phase change and decrease in viscosity, and rapidly cooling the mixture through a second transition temperature characterized in the absence of such cooling by water liberation and crystal agglomeration.

---

This invention relates to the production and use of new and useful compositions of matter which contain monoglycerides of fat forming fatty acids.

The commercial production of the so-called "monoglycerides" fall into two categories; those products which contain approximately 45% to 60% alpha monoglycerides and the balance diglycerides with a small percentage of triglycerides and other fractions, and those products (hereinafter sometimes referred to specifically as "alpha monoglycerides") further purified by techniques such as molecular distillation which are characterized as having much higher alpha monoglyceride content, commonly in the order of about 85%, the major portion of the balance usually comprising diglycerides. The parent fat sources used in preparing the commercial monoglycerides vary in composition and generally include such common products as cottonseed oil, corn oil, peanut oil, soybean oil, lard or the like containing various mixtures of both saturated and unsaturated fats. Where greater saturation is desired, it is usually produced by hydrogenation of the parent fat product.

Monoglycerides of the foregoing categories are in wide commercial use in the food industry for a number of purposes, for example, in the bakery field where they are incorporated into the dough for producing improved bread, rolls, buns and cakes. Monoglycerides used by the baking industry commonly vary not only in mono, di and triglyceride ratios but also in the degree of saturation of the fatty acid moiety. It has been suggested that the alpha monoglyceride fraction is the primary active ingredient, however, which monoglyceride product is actually used has been dictated by economic considerations and incorporated characteristics. The distilled monoglycerides having the higher alpha monoglyceride content, though usually more effective are generally more expensive than the mono-diglyceride mixtures and, as discussed more fully below, highly saturated monoglyceride products generally, and especially fully saturated alpha monoglycerides present serious incorporation difficulties.

In accordance with this invention, it has been determined that the degree of saturation of the fatty acid moiety together with control of the particle or crystal size of the monoglyceride product when incorporated into the food is of great significance.

So far as starch doughs are concerned it has been found that fully saturated (iodine value less than about 5) fine grain (less than about 20 microns) monoglyceride products are the most effective in influencing structure in a desired manner. In fat free starch doughs fine grain, fully saturated monoglyceride products containing a higher proportion of diglycerides produce bread with the most desirable structure. In the presence of fat, the finest and most even textured starch breads results with fine grain fully saturated monoglyceride products containing the highest percentage of alpha monoglycerides.

As noted above, monoglyceride products of the fully saturated type have presented considerable difficulties in the introduction or incorporation thereof into the food product during manufacture. Normally, fully saturated monoglyceride products are hard and waxy-like, and in their neutralized and preferred form (with a pH of less than 7.0) are virtually insoluble in water and only slightly soluble in fats and oils. Further, these products have a curious characteristic of forming nondispersible gels when heated in the presence of water at temperatures exceeding their melting points. This is particularly true of such products containing more than 50% alpha monoglycerides and becomes an extremely difficult problem with those materials made by molecular distillation containing about 85% alpha monoglycerides. Suggestions have been made (particularly concerning products not fully saturated) for easing the incorporation problems by introducing materials of this type into the food in the form of a dispersion in water, however, such techniques have generally been characterized by the dispersions being achieved at temperatures below the gel point or melting point of the monoglyceride product used and sometimes required undesired foreign additives. Also, in each case these techniques, when used with highly saturated monoglyceride products, tended to produce a dispersion of relatively large average particle or crystal size and form a material which tended to be non-uniform in structure and unstable in storage.

The principal objects of the present invention are to provide a highly saturated monoglyceride products of micro crystal size which are highly superior as starch complexing agents; to provide such products which may be comprised primarily of alpha monoglycerides; to provide stable and uniform monoglyceride crystal dispersions in water of monoglycerides derived from fully hydrogenated fats and characterized in having an average size of crystals of dispersion of less than approximately 20 microns; to provide a micro-crystal monoglyceride dispersion which is normally a non-pourable plastic but which easily disperses in water at normal room temperatures to make a liquid which may be metered without difficulty for use in continuous food mixing apparatus; to provide such products which are more effective in improving bakery goods made by both the batch and continuous processes; and to provide a process of preparing such micro-crystal monoglyceride products.

Other objects and advantages of this invention will become apparent from the following description wherein are set forth by way of example certain embodiments of this invention.

In the practice of this invention improved hydrates of monoglycerides are obtained by initially forming a viscous gel in a high shear processing unit wth the continuous addition of water at a closely regulated temperature so as to obtain a resultant final temperature at a point at which typical phase shift occurs in the mixture. The temperature at which this phase shift occurs is dependent upon the composition of the monoglyceride and is characterized by a marked decrease in viscosity of the dispersion in a high shear environment. This phase transition occurs in a temperature range of from about 125° F. for fully saturated monoglyceride mixtures containing approximately 50% alpha monoglycerides to about 137° F. for fully saturated distilled monoglycerides containing approximately 85% alpha monoglycerides. The material is then passed through a high pressure homogenizer and immediately onto a swept surface heat exchanger for rapid cooling. The initial dispersion should leave the homogenizer at the phase transition temperature noted above. Using a piston type homogenized under normal operating pressures ranging from 500 to 3500 p.s.i., average particle sizes ranging from 20 microns to less than one micron are produced. The crystal size made by this procedure may be observed and measured with an appropriate microscope.

It has been found desirable to produce a rapid temperature drop of at least 30° F. at the heat exchanger and in practice a temperature differential of as much as 90° F. may be used in order to maintain minimum crystal size in the finished product. The reason is that if the dispersion is packaged hot directly from the monogenizer, a secondary transition tends to occur upon ambient cooling to a temperature of from 5° F. to 15° F. below the initial phase transition temperature noted above. When this latter transition occurs, free water is liberated and the monoglyceride crystals tend to coalesce, which causes separation of the product, a consequent loss of effectiveness and degradation of appearance. By shock cooling on the swept surface heat excahnger through the latter transition temperature these difficulties are avoided.

As it exists from the heat exchanger the dispersion is in the form of a liquid about the consistency of cream when the weight ratio of monoglycerides to water is roughly about 1:4. Upon standing, a crystal orientation occurs and the product becomes a smooth creamy plastic solid. The time required for this change to take place ranges from about 15 to 60 minutes.

Dispersions manufactured by the described process are somewhat critical with regard to the proportion of monoglycerides to water in order to have a consistency desirable for shipping, handling and incorporating with other ingredients in use, that is, whereby the material is solid but may be easily scooped and mixed. In producing hydrates of such consistency from monoglycerides made from fully hydrogenated fats which have an iodine value of less than 5, optimum water percentages range from about 70% to 85%. These plastic solid hydrates are easily dispersed in room-temperature water with agitation to produce a pourable liquid which can be metered by conventional liquid metering pumps used in continuous mix processes. This is of great importance in food producing industries where plastics (e.g., shortenings) are not normally handled, such as in manufacturing macaroni. The addition of unsaturated monoglycerides such as those made from lard or partially hydrogenated oils have a tendency to lower and make less critical the required proportion of water, probably due to a lubricating effect. It is noted, however, that the micro crystals characterizing this invention are to be differentiated from what appears to be an amorphous structure produced in hydrates made from monoglycerides with any significant number of unsaturated bonds.

The manufacture of micro crystal dispersions of monoglycerides derived from fully hydrogenated fats is illustrated by the following examples:

Example 1

A distilled monoglyceride marketed under the name "Myverol 18–00" (Distillation Products Company) and manufactured from fully hydrogenated lard was used. The monoglyceride was melted at a temperature of 180° F. in a steam jacketed first kettle. The high shear mixing apparatus consisted of a 60 gallon stainless steel second kettle equipped with a 25 gallon per minute positive displacement pump on the bottom which recirculated the contents thereof through a homogenizing head containing a stack of perforated shear plates. Water at 130° F. was added to the second kettle at the constant rate of approximately 100 pounds per minute and delivered thereto simultaneously with melted monoglyceride from the first kettle at approximately the same rate with continuous circulation through the pump and homogenizing head. After the melted monoglyceride was all added the water addition was continued at the initial rate. A phase transition occurred at a temperature of 137° F. with the dispersion shifting from a very viscous fluid to a creamy like consistency, accompanied by a color change from light tan to white. The dispersion was allowed to recirculate for four minutes subsequent to the addition of all of the water to assure complete uniformity. The batch formula consisted of 80 pounds of monoglyceride and 295 pounds of water, the resultant product having a solids content of 21.3% by weight.

At the end of the four minute recirculation the dispersion was pumped into an agitated holding tank feeding an homogenizer. The homogenization was accomplished by using a Gaulin piston type homogenizer operating at a pressure of 1500 p.s.i. Outlet temperature from the homogenizer was measured by an inline thermocouple at 137° F. although the temperature of the batch just prior to entering the homogenizer had dropped to about 135° F. The temperature pick-up resulted from the energy input of the homogenizer. The dispersion was fed continuously directly into a two barrel swept surface "Creamery Package" (the Creamery Package Mfg. Company) heat exchanger using ice water as the coolant at a temperature of 60° F. The chilled and liquid dispersion was packaged directly from the heat exchanger in drums. After sixty minutes the liquid dispersion had transformed into a creamy non-pourable plastic. The crystal size measured at 403x with a microscope equipped with a micrometer was found to range from ten microns to one micron.

Example 2

The procedure and equipment described in Example 1 were used with the following variations. The monoglyceride was that currently being marketed under the name "Atmul 124" (Atlas Chemical Industries). This product was a mono-diglyceride mixture containing 54.0% alpha monoglyceride derived from fully hydrogenated tallow. The conditions for making the dispersion were as follows:

| | |
|---|---|
| Melted monoglyceride temperature ° F. | 160 |
| Water temperature ° F. | 118 |
| Phase transition temperature ° F. | 127 |
| Homogenizer pressure p.s.i. | 2000 |
| Homogenizer outlet temperature ° F. | 127 |
| Heat exchanger temperature ° F. | 60 |

The batch formula consisted of 90 pounds of monoglyceride and 290 pounds of water with a resultant solids content of 23.7%. Transition from a liquid to a non-pourable plastic occurred in 15 minutes. Particle size as determined by the microscope was found to be from 5 microns to less than one micron.

Example 3

The procedure and equipment described in Example 1 were used with the following variations. The monoglyceride was that currently being marketed under the trade name "Drewmulse 900" (Drew Chemical Corporation). This product was a mono-diglyceride mixture containing 52% alpha monoglyceride and was derived from fully hydrogenated soy oil. The conditions for making the dispersion were as follows:

| | |
|---|---|
| Melted monoglyceride temperature ° F. | 170 |
| Water temperature ° F. | 120 |
| Phase transition temperature ° F. | 129 |
| Homogenizer pressure p.s.i. | 2500 |
| Homogenizer outlet temperature ° F. | 129 |
| Heat exchanger temperature ° F. | 60 |

The batch formula consisted of 85 pounds of monoglyceride and 290 pounds of water with a resultant solids content of 22.7%. The particle size range was found to be from three microns to less than one micron.

Although certain forms of this invention have been described, it is not to be limited thereto except insofar as such limitations are included in the claims.

We claim:

1. A plastic agent adapted for incorporation into food products comprising a stable and uniform crystal dispersion of monoglyceride in water, said monoglyceride being derived from fully hydrogenated edible fats, said monoglyceride being characterized as having an average size of crystals of dispersion of less than approximately 20 microns, the monoglyceride to water ratio being about 1:4 by weight.

2. A process for manufacturing stable and uniform plastic crystalline dispersions in water of edible saturated monoglyceride comprising; mixing water and monoglyceride in a ratio of about 4:1 by weight at a temperature whereat a gel is formed, subjecting the gel to agitation at a first transition temperature of from about 125° F. to abut 137° F. and characterized by a phase change and marked decrease in viscosity, subjecting the resulting mixture to crystal size reducing stresses substantially at said first transition temperature and sufficient to reduce crystal size to less than approximately 20 microns, and rapidly cooling the mixture through a second transition temperature of at least about 30° F. below said first transition temperature and characterized in the absence of such cooling by water liberation and crystal agglomeration.

3. The process as set forth in claim 2 wherein the step of subjecting the mixture to crystal size reducing stresses is accomplished by homogenizing.

References Cited

UNITED STATES PATENTS

| | | | |
|---|---|---|---|
| 2,871,124 | 1/1959 | Kuhrt et al. | 99—118 |
| 3,034,898 | 5/1962 | Kuhrt et al. | 99—91 |
| 3,111,409 | 11/1963 | Jackson et al. | 99—91 |

MAURICE W. GREENSTEIN, *Primary Examiner.*